US006583193B2

(12) United States Patent
Park et al.

(10) Patent No.: US 6,583,193 B2
(45) Date of Patent: Jun. 24, 2003

(54) POLYOLEFIN FOAM USEFUL FOR SOUND AND THERMAL INSULATION

(75) Inventors: Chung P. Park, Baden-Baden (DE); Michel Brucker, Kilstett (FR); Georges Eschenlauer, Sofflenheim (FR); Michael E. Schaller, Midland, MI (US); Jean-Francois Koenig, Rheinmuenster (DE)

(73) Assignee: Dow Global Technologies Inc., Midland, MI (US)

( * ) Notice: Subject to any disclaimer, the term of this patent is extended or adjusted under 35 U.S.C. 154(b) by 105 days.

(21) Appl. No.: 09/802,383

(22) Filed: Mar. 9, 2001

(65) Prior Publication Data

US 2001/0039299 A1 Nov. 8, 2001

Related U.S. Application Data

(60) Provisional application No. 60/190,720, filed on Mar. 17, 2000.

(51) Int. Cl.[7] ................. C08J 9/00; C08J 9/38
(52) U.S. Cl. .............. 521/142; 521/79; 521/143; 521/918
(58) Field of Search ............ 521/142, 79, 143, 521/918

(56) References Cited

U.S. PATENT DOCUMENTS

| | | | |
|---|---|---|---|
| 3,239,585 A | 3/1966 | Karpovich et al. ............ 264/84 |
| 3,386,877 A | 6/1968 | Skochdopole et al. ...... 161/160 |
| 3,573,152 A | 3/1971 | Wiley et al. .................. 161/60 |
| 3,939,849 A | * 2/1976 | Baxter et al. |
| 4,229,396 A | 10/1980 | Suh et al. ..................... 264/53 |
| 4,232,130 A | * 11/1980 | Baxter et al. |
| 4,279,848 A | 7/1981 | Baxter et al. ................. 264/53 |
| 4,323,528 A | 4/1982 | Collins .......................... 264/53 |
| 4,423,101 A | 12/1983 | Willstead ..................... 428/76 |
| 4,435,346 A | 3/1984 | Ito et al. ....................... 264/54 |
| 4,548,775 A | 10/1985 | Hayashi et al. ............ 264/45.5 |
| 4,714,716 A | 12/1987 | Park ............................. 521/80 |
| 4,824,720 A | 4/1989 | Malone ....................... 428/294 |
| 4,916,198 A | 4/1990 | Scheve et al. ............... 526/351 |
| 5,116,881 A | 5/1992 | Park et al. ................... 521/143 |
| 5,206,082 A | 4/1993 | Malone ....................... 428/294 |
| 5,242,634 A | 9/1993 | Matsumoto et al. .......... 264/25 |
| 5,348,795 A | * 9/1994 | Park |
| 5,424,016 A | 6/1995 | Kolosowski ................ 264/156 |
| 5,489,407 A | 2/1996 | Suh et al. ...................... 264/50 |
| 5,527,573 A | 6/1996 | Park et al. ............... 428/314.8 |
| 5,567,742 A | 10/1996 | Park ............................. 521/143 |
| 5,585,058 A | 12/1996 | Kolosowski ................ 264/156 |
| 5,618,853 A | 4/1997 | Vonken et al. ................ 521/60 |
| 5,776,390 A | 7/1998 | Fiddelaers et al. ............ 264/50 |
| 5,817,705 A | 10/1998 | Wilkes et al. ................ 521/79 |
| 5,843,058 A | 12/1998 | Quist .......................... 604/369 |
| 6,007,890 A | 12/1999 | DeBlander .................... 428/72 |
| 6,187,232 B1 | * 2/2001 | Chaudhary et al. |
| 6,207,254 B1 | 3/2001 | Lee et al. .................... 428/159 |
| 6,225,366 B1 | 5/2001 | Raetsch et al. ............. 521/134 |
| 6,251,319 B1 | 6/2001 | Tusim et al. ................ 264/45.9 |
| 6,284,810 B1 | 9/2001 | Burnham et al. ............. 521/79 |
| 6,369,120 B1 | * 4/2002 | Chaudhary et al. |

FOREIGN PATENT DOCUMENTS

| | | | |
|---|---|---|---|
| DE | 3514817 | 10/1985 | ............. C08J/9/38 |
| EP | 190889 | 4/1993 | ............. C08F/8/50 |
| EP | 0 879 844 | 11/1998 | ............. C08J/9/00 |
| EP | 674578 | 9/1999 | ........... B29C/44/00 |
| JP | 5-9030871 | 2/1984 | ............. C09D/5/12 |
| JP | 6-2273826 | 11/1987 | ........... B29C/59/02 |
| JP | 0-2188233 | 7/1990 | ........... B29C/67/20 |
| WO | WO 84/00901 | 3/1984 | ........... B01D/39/00 |
| WO | WO 90/14159 | 11/1990 | ........... B01J/20/26 |
| WO | WO 94/13460 | 6/1994 | ........... B29C/67/22 |
| WO | WO98/08667 | 3/1998 | ........... B29C/44/46 |
| WO | WO 00/12594 | 3/2000 | ............. C08J/9/00 |
| WO | WO 00/15700 | 3/2000 | ............. C08J/9/00 |

\* cited by examiner

*Primary Examiner*—Morton Foelak

(57) ABSTRACT

An extruded, coalesced foam strand propylene polymer material that is either open-celled and useful for sound insulation applications or close celled and useful for thermal insulation applications.

An apparatus suitable for preparing such foams with an expanded cross-section.

20 Claims, 2 Drawing Sheets

POLYOLEFIN FOAM USEFUL FOR SOUND AND THERMAL INSULATION

CROSS-REFERENCE STATEMENT

This application claims the benefit of U.S. Provisional Application No. 60/190,720 filed Mar. 17, 2000.

BACKGROUND OF THE INVENTION

This invention relates generally to open-cell polyolefin foam with utility in both sound and thermal insulation applications and its preparation.

U.S. Pat. No. 5,348,795 discloses preparation of dimensionally stable, open-cell polypropylene foam products. Preferred propylene polymer resins are branched or lightly cross-linked. The examples that relate to extruded, coalesced foam strand structures have an open-cell content of 34–72 percent, a cell size of 0.36–0.85 millimeters (mm) and a density of 22.1–31.7 kilograms per cubic meter (kg/m$^3$). It also discloses use of graphite forming plates that are lined with polytetrafluoroethylene sheet.

SUMMARY OF THE INVENTION

One aspect of the present invention is an extruded, open-cell, coalesced foam strand material that comprises a propylene polymer material and has a density of 22 kg/m$^3$ or less ($\leq$), preferably $\leq$20 kg/m$^3$, an open-cell content of at least ($\geq$) 50 percent and a cell size $\leq$two mm.

In a related aspect, the material has an open-cell content $\geq$80 percent. The structure is preferably substantially free of mechanically induced perforation channels.

A second aspect of the invention is an extruded, open-cell, acoustically active, coalesced foam strand material that comprises a propylene polymer material and has a density of $\leq$100 kg/m$^3$, an open-cell content of $\geq$50%, a cell size of $\leq$two mm and, in its extrusion direction, a noise reduction coefficient $\geq$0.3, the foam having defined therein a plurality of perforation channels, the channels being oriented in a direction generally perpendicular to the extrusion direction.

A third aspect of the invention is an extruded, open-cell, coalesced foam strand material that comprises a propylene polymer material and has a density $\leq$20 kg/m$^3$ and an open-cell content $\leq$50 percent.

A fourth aspect of the invention is an extruded, substantially closed-cell, coalesced foam strand material that comprises a propylene polymer material and has a density of 20 kilograms per cubic meter or less, an open-cell content of less than 20 percent and a cell size of two millimeters or less.

A fifth aspect of the invention is a foam-forming apparatus comprising:
a) a foam extrudate receiving roller assembly;
b) a second roller assembly, the second roller assembly being connected to the foam extrudate receiving roller assembly by at least one articulated linkage; and
c) a foam tensioning assembly, the foam tensioning assembly being spaced apart from, but in operative relation to, the second roller assembly. In a related aspect, the apparatus further comprises a forming plate assembly. The forming plate assembly may either replace the second roller assembly or it may supplement roller assemblies a) and b). As a substitute, the forming plate assembly is preferably connected to the foam extrudate receiving roller assembly by at least one articulated linkage. As a supplement, the forming plate assembly is preferably connected in the same manner to the second roller assembly and spaced apart from, but in operative relation to the foam tensioning assembly. The forming plate assembly preferably has at least one lubricant applicator operatively connected thereto. The lubricant applicator preferably supplies a lubricant material to forming plate assembly surfaces that contact a foam material during operation of the apparatus.

BRIEF DESCRIPTION OF THE DRAWING

Figure (FIG. 1) is a schematic illustration of a foam-forming apparatus of the fifth aspect present invention.

DESCRIPTION OF PREFERRED EMBODIMENTS

Figure 1:
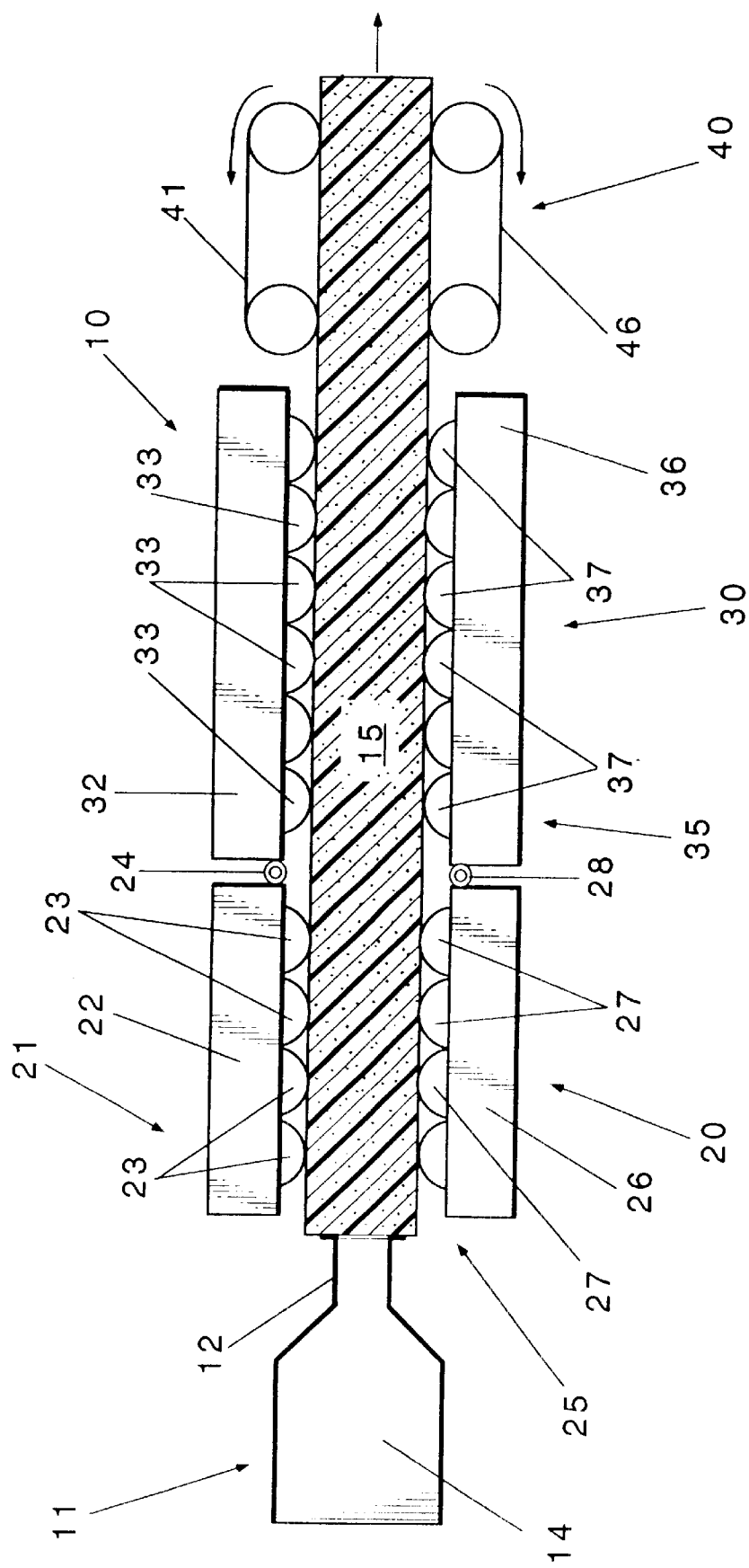

Extruded, coalesced foam strand materials or structures of the first and second aspects of the present invention have an open-cell structure as evidenced by an open-cell content $\geq$50%, preferably $\geq$70% and more preferably $\geq$80%. Extruded, coalesced foam strand materials of the fourth aspect of the present invention have a substantially closed-cell structure as evidenced by an open cell content of less than 20%. Materials of the third aspect may have either an open-cell structure as evidenced by an open-cell content of from 20 to less than or equal to ($\leq$) 50% or a closed-cell structure as evidenced by an open cell content of less than 20%. American Society for Testing and Materials test D2856-A (ASTM D2856-A) outlines procedures for determining open-cell content.

Open-cell foam structures having a relatively low specific airflow resistance (International Standards Organization (ISO) 9053: 1991 (E)) provide enough sound absorption for use in sound management applications. An optimum specific airflow resistance value for sound absorption lies approximately within a range of from $\geq$800 to $\leq$2000 Pascal seconds per meter. In order to have such a specific airflow resistance at a thickness of 25 mm, an open-cell foam should have an airflow resistivity approximately within a range of from $\geq$32 to $\leq$80 kilopascal seconds per square meter (kPa s/m$^2$). Although sub-optimum for sound absorption, a foam having an airflow resistivity lower than 32 kPa s/m$^2$ is also useful for sound management, in particular, for sound insulation.

Achieving such an airflow resistivity with polyolefin foam presents manufacturing challenges. The present invention overcomes these challenges by converting a linear polyolefin resin into an extruded, coalesced foam strand structure that has a high (as defined below) open-cell content. The resulting foam structure has an airflow resistivity, in its extrusion direction, of no more than ($\leq$) 70 kPa s/m$^2$. This provides a desirable level of sound absorption in that direction. In order to have satisfactory sound absorption in a direction perpendicular to the extrusion direction, the foam is preferably perforated, such as with needles, in the perpendicular direction.

The extruded, coalesced foam strand materials also have an airflow resistivity (AFR), measured in the extrusion direction, $\leq$70 kPa s/m$^2$, preferably $\leq$50 kPa s/m$^2$, and more preferably within a range of 5–20 kPa s/m$^2$. Determine AFR in accordance with ISO 9053: 1991(E), Method A.

The extruded foam strand materials are optionally, but preferably, perforated so as to have perforation channels defined therein. Perforation tends to improve a foam material's average sound absorption coefficient (ASC) relative to the same foam material prior to perforation. ASC is the arithmetic average of sound absorption coefficients, measured according to ASTM E-1050, of a foam specimen having a thickness of 25 mm at frequencies of 25, 500, 1000 and 2000 Hertz (Hz). Any perforation pattern or frequency may be used so long as the ASC of the foam material is at least ($\geq$) 0.3, preferably greater than (>) 0.3. While one may use a perforation pattern with a frequency of less than (<) one hole per square centimeter ($cm^2$) if desired, a perforation pattern with a frequency of $\geq$one hole per $cm^2$ and spacing between holes of about 10 mm provides satisfactory results. The frequency is preferably $\geq$four holes per $cm^2$ with a spacing of about 5 mm. Skilled artisans recognize that laboratory data, such as ASC, determined in accord with ASTM E-1050, provide a reasonable approximation of a material's noise reduction coefficient (NRC). NRC is an arithmetic average of sound absorption coefficients, measured per ASTM C-423 using a reverberation room, at frequencies of 250, 500, 1000 and 2000 Hz. ASTM E-1050 method relies on an impedance tube.

The coalesced, extruded foam strand materials of the present invention that are suitable for use in sound absorption applications preferably have an ASC, measured in the foam's extrusion direction, $\geq$0.3.

Any conventional perforation means may be used to perforate the extruded, coalesced foam strand materials of the present invention. Mechanical means, such as a two mm conical needle or a grid of such needles, provide very desirable results. Perforation preferably occurs in a direction generally perpendicular to the extrusion.

The extruded, coalesced foam strand materials of the present invention are suitable for sound insulation applications (e.g. as a core material in a sandwich panel construction). In such an application, the material must have a low dynamic stiffness. The low density, open-cell, extruded, coalesced strand foam materials of the present invention have a low dynamic stiffness. Elastification of such foam materials, as described below, leads to an even lower dynamic stiffness. A preferred elastification technique involves quickly applying sufficient pressure to compress the foam from its original thickness by $\geq$50%, preferably $\geq$80%, more preferably $\geq$90%, even more preferably $\geq$95%, and then releasing the applied pressure.

The elastified foam has a dynamic modulus lower than 1 Newton per square millimeter ($N/mm^2$), preferably lower than 0.6 $N/mm^2$, and more preferably lower than 0.4 $N/mm^2$. The dynamic modulus, by definition, is greater than zero $N/mm^2$.

The extruded, coalesced foam strand materials of the present invention have a cell size that preferably does not exceed two mm. The cell size is more preferably $\leq$1.5 mm and still more preferably $\leq$1 mm.

The coalesced foam strand materials of the second aspect of the invention have a density ($\rho$) that is $\leq$100 $kg/m^3$, desirably $\leq$60 $kg/m^3$, preferably $\leq$30 $kg/m^3$ and more preferably $\leq$20 $kg/m^3$. The materials of the first aspect of the invention have a density of $\leq$22 $kg/m^3$, preferably $\leq$20 $kg/m^3$. Those of the third and fourth aspects have a density $\leq$20 $kg/m^3$. The preferred and more preferred densities produce very satisfactory results for all foam products of the present invention irrespective of whether they have perforation channels defined therein. The density is also >0 $kg/m^3$, desirably $\geq$5 $kg/m^3$, preferably $\geq$10 $kg/m^3$ and more preferably $\geq$10–20 $kg/m^3$.

The extruded, coalesced foam strand materials of the present invention also find use in thermal insulation applications in that they have a thermal conductivity of 45 milliwatts per meter ° Kelvin ($mW/m° K$) or less, preferably 40 $mW/m° K$ or less and more preferably 35 $mW/m° K$ or less. Extruded, coalesced foam strand materials suitable for use in thermal insulation applications may be open-cell foam materials with an open-cell content less than 80%, preferably less than 70% and more preferably less than 60%. Other suitable coalesced foam strand materials are regarded as closed-cell foams in that they have an open-cell content below 20%.

When prepared with the foam-forming apparatus of the fifth aspect of the invention or its related aspect, the coalesced foam strand materials tend to have a smooth outer surface.

The coalesced foam strand materials desirably result from a polymer composition that comprises a linear polyolefin resin or a blend of a linear polyolefin resin and a different thermoplastic resin. Polypropylene (PP) homopolymers and propylene copolymer resins provide satisfactory results when used as the linear polyolefin resin. U.S. Pat. No. 5,527,573 discloses suitable propylene polymer materials at column 3, lines 27–52, the teachings of which are incorporated herein by reference. The propylene polymer materials include (a) propylene homopolymers, (b) random and block copolymers of propylene and an olefin selected from ethylene, 1-olefins ($\alpha$-olefins) containing 4 to 10 carbon atoms ($C_{4-10}$) and $C_{4-10}$ dienes, and (c) random terpolymers of propylene and two monomers selected from ethylene and $C_{4-10}$ $\alpha$-olefins. The $C_{4-10}$ $\alpha$-olefins may be linear or branched, but are preferably linear. Suitable propylene polymer materials have a melt flow rate or MFR (ASTM D-1238, Condition 230° C./2.16 kilograms (kg)) of 0.01–100 grams per ten minutes (g/10 min), preferably 0.01–50 g/10 min, more preferably 0.05–10 g/10 min, and still more preferably 0.1 to 3 g/10 min.

The PP and propylene copolymer resins may, if desired, be high melt strength resins prepared by a branching method known in the art. The methods include irradiation with high energy electron beam (U.S. Pat. No. 4,916,198), coupling with an azidofunctional silane (U.S. Pat. No. 4,714,716) and reacting with a peroxide in the presence of a multi-vinyl functional monomer (EP 879,844-A1). Satisfactory results follow, however, from use of less expensive resins or additives.

Preparation of suitable coalesced foam strand materials desirably uses conventional extrusion procedures and apparatus such as those detailed in U.S. Pat. No. 3,573,152, and U.S. Pat. No. 4,824,720. The teachings of these patents are incorporated herein in their entirety.

In a conventional extrusion foaming process, one converts polymer constituents into a polymer melt and incorporates a blowing agent and, if desired, other additives such as a nucleator, into the polymer melt to form a foamable gel. One then extrudes the foamable gel through a die and into a zone of reduced or lower pressure that promotes foaming to form a desired product. The reduced pressure is lower than that under which the foamable gel is maintained prior to extrusion through the die. The lower pressure may be superatmospheric or subatmospheric (vacuum), but is preferably at an atmospheric level.

In making coalesced foam strand products of the present invention, one passes the foamable gel through a multi-orifice die into a zone of lower pressure that favors foaming. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles stay adhered to one another in a unitary structure to prevent strand delamination under stresses encountered in preparing, shaping, and using the foam.

Before extruding foamable gel through a die, one typically cools the foamable gel from a temperature that promotes melt mixing to a lower, optimum foaming temperature. The gel may be cooled in the extruder or other mixing device or in separate coolers. The optimum foaming temperature typically exceeds each polymer constituent's glass transition temperature ($T_g$), or for those having sufficient crystallinity to have a melt temperature ($T_m$), near the $T_m$. "Near" means at, above, or below and largely depends upon where stable foam exists. The temperature desirably falls within 30° centigrade (° C.) above or below the $T_m$. For foams of the present invention, an optimum foaming temperature is in a range in which the foam does not collapse.

The blowing agent may be incorporated or mixed into the polymer melt by any means known in the art such as with an extruder, mixer, or blender. The blowing agent is mixed with the polymer melt at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting.

Any conventional blowing agent may be used to prepare the coalesced foam strand products of the present invention. U.S. Pat. No. 5,348,795 discloses a number of suitable blowing agents at column 3, lines 15–61, the teachings of which are incorporated herein by reference. U.S. Pat. No. 5,527,573 also discloses a number of suitable blowing agents at column 4, line 66 through column 5, line 20, the teachings of which are incorporated herein by reference. Preferred blowing agents include aliphatic hydrocarbons having 1–9 carbon atoms, especially propane, n-butane and isobutane, more preferably isobutane.

Foams of the present invention may also be made using an accumulating extrusion process and apparatus such as that shown in U.S. Pat. No. 4,323,528 and U.S. Pat. No. 5,817,705, the teachings of which are incorporated herein by reference. This apparatus, commonly known as an "extruder-accumulator system" allows one to operate a process on an intermittent, rather than a continuous, basis. The apparatus includes a holding zone or accumulator where foamable gel remains under conditions that preclude foaming. The holding zone is equipped with an outlet die that opens into a zone of lower pressure, such as the atmosphere. The die has an orifice that may be open or closed, preferably by way of a gate that is external to the holding zone. Operation of the gate does not affect the foamable composition other than to allow it to flow through the die. Opening the gate and substantially concurrently applying mechanical pressure on the gel by a mechanism (e.g. a mechanical ram) forces the gel through the die into the zone of lower pressure. The mechanical pressure is sufficient to force foamable gel through the die at a rate fast enough to preclude significant foaming within the die yet slow enough to minimize and preferably eliminate generation of irregularities in foam cross-sectional area or shape. As such, other than operating intermittently, the process and its resulting products closely resemble those made in a continuous extrusion process.

The coalesced foam strand materials of the present invention have utility in both thermal and sound insulation applications. They have a combination of cell size and open-cell structure, optionally interconnected by way of perforation channels that allow them to effectively serve both applications.

The coalesced foam strand materials of the present invention may contain one or more conventional additives. The additives include, without limitation, nucleating agents, inorganic fillers, conductive fillers, pigments, antioxidants, acid scavengers, flame retardants, ultraviolet absorbers, processing aids, extrusion aids, permeability modifiers, antistatic agents, radiation blocking materials and other thermoplastic polymers. Certain of the additives, such as inorganic and conductive fillers, may also function as nucleating agents, promote formation of open cells or both. The coalesced foam strand materials preferably contain at least one of a radiation blocking material such as carbon black and a flame retardant additive.

Solid particulate additives such as a radiation blocker and a flame retardant synergist (e.g. antimony oxide or $Sb_2O_3$) tend to nucleate excessively thereby restricting foam expansion and, ultimately, foam cross-sectional size. To counteract this, one may add a cell enlarging agent such as a waxy material with a relatively low melting point (U.S. Pat. No. 4,229,396) or a non-waxy, low molecular weight compound (U.S. Pat. No. 5,489,407). The teachings of the two patents are incorporated herein by reference.

A large-pore foam is prepared by extruding a PP resin in a coalesced strand structure at a temperature a little from 1° C. to 15° C., preferably 1° C. to 5° C., warmer than the highest temperature where a closed-cell foam is made, and optionally gently forming the foam body at the die using rollers such as those of the fifth aspect or its related aspect.

In the Figs., use of a single number, such as second foam tensioning assembly 40, indicates use of the same component in each Fig. The use of a variation of the number, such as 40', indicates use of a similar component.

FIG. 1 schematically illustrates a foam-forming apparatus 10. Apparatus 10 comprises a foam extrudate receiving roller assembly 20, a second roller assembly 30, and a foam tensioning assembly 40.

The foam extrudate receiving assembly 20 has a first bank of rollers 21 and a second bank of rollers 25 that is spaced apart from, but generally parallel to the first bank of rollers 21. The first bank of rollers 21 comprises a first roller frame 22 and a plurality of rollers 23. The second bank of rollers 25 comprises a second roller frame 26 and a plurality of rollers 27.

The second roller assembly 30 has a third bank of rollers 31 and a fourth bank of rollers 35 that is spaced apart from, but generally parallel to the third bank of rollers 31. The third bank of rollers 31 comprises a third roller frame 32 and a plurality of rollers 33. The fourth bank of rollers 35 comprises a fourth roller frame 36 and a plurality of rollers 37.

The first roller frame 22 and the third roller frame 32 are operatively connected by way of at least one, preferably at least two, articulated linkages 24 (only one of which is shown). The second roller frame 26 and the fourth roller frame 36 are operatively connected by way of at least one, preferably at least two, articulated linkages 28 (only one of which is shown).

The foam tensioning assembly 40 comprises a first moving belt 41 and a second moving belt 46 that is spaced apart from, but generally parallel to, the first moving belt 41. The first moving belt 41 rotates counter-clockwise and the second moving belt 46 rotates clockwise. Although FIG. 1 illustrates moving belts and moving belts provide very satisfactory results, skilled artisans readily recognize that other apparatus may be used as a foam tensioning assembly. One such apparatus is an opposed pair of driven pull rolls.

In operation a melt processing apparatus 11 (illustrated as a partial cutaway view of an extruder) that is equipped with a foaming die 12 (preferably a multiple aperture foam strand die) supplies a foamable gel 14 to a zone of lower pressure bounded by the first bank of rollers 21 and the second bank of rollers 25. The foamable gel expands until it contacts the two banks of rollers (21 and 25) and at least partially solidifies into a foam body 15.

A combination of pressure from apparatus 11 and action by rollers contained in the roller banks 21 and 25 moves foam body 15 from the first and second roller banks 21 and 25 to and through the second roller assembly 30 and spaced apart third roller bank 31 and fourth roller bank 35. Foam body 15 exits roller assembly 30 and enters foam tensioning assembly 40 where it contacts first moving belt 41 and second moving belt 46. The moving belts 41 and 46 cooperate to draw the foam body away from the second roller assembly 30.

Once the foam tensioning assembly 40 begins to act upon and advance foam body 15 through the assembly, one may adjust spacing (and if necessary or desirable alignment) between the first and second roller banks 21 and 25 of assembly 20 and between the third and fourth roller banks 31 and 35 of assembly 30 to apply a greater or lesser amount of compressive force to the foam body as it advances through apparatus 10.

Skilled artisans recognize that articulated linkages 24 cause those ends of first roller bank 21 and third roller bank 31 that are closest to each other to move in the same direction. In other words if that end of roller bank 21 moves away from foam body 15, the closest or proximate end of roller bank 31 will also move away from foam body 15. Articulated linkages 28 that connect proximate ends of second roller bank 25 and fourth roller bank 35 operate in the same manner as articulated linkages 24.

Figure 2:
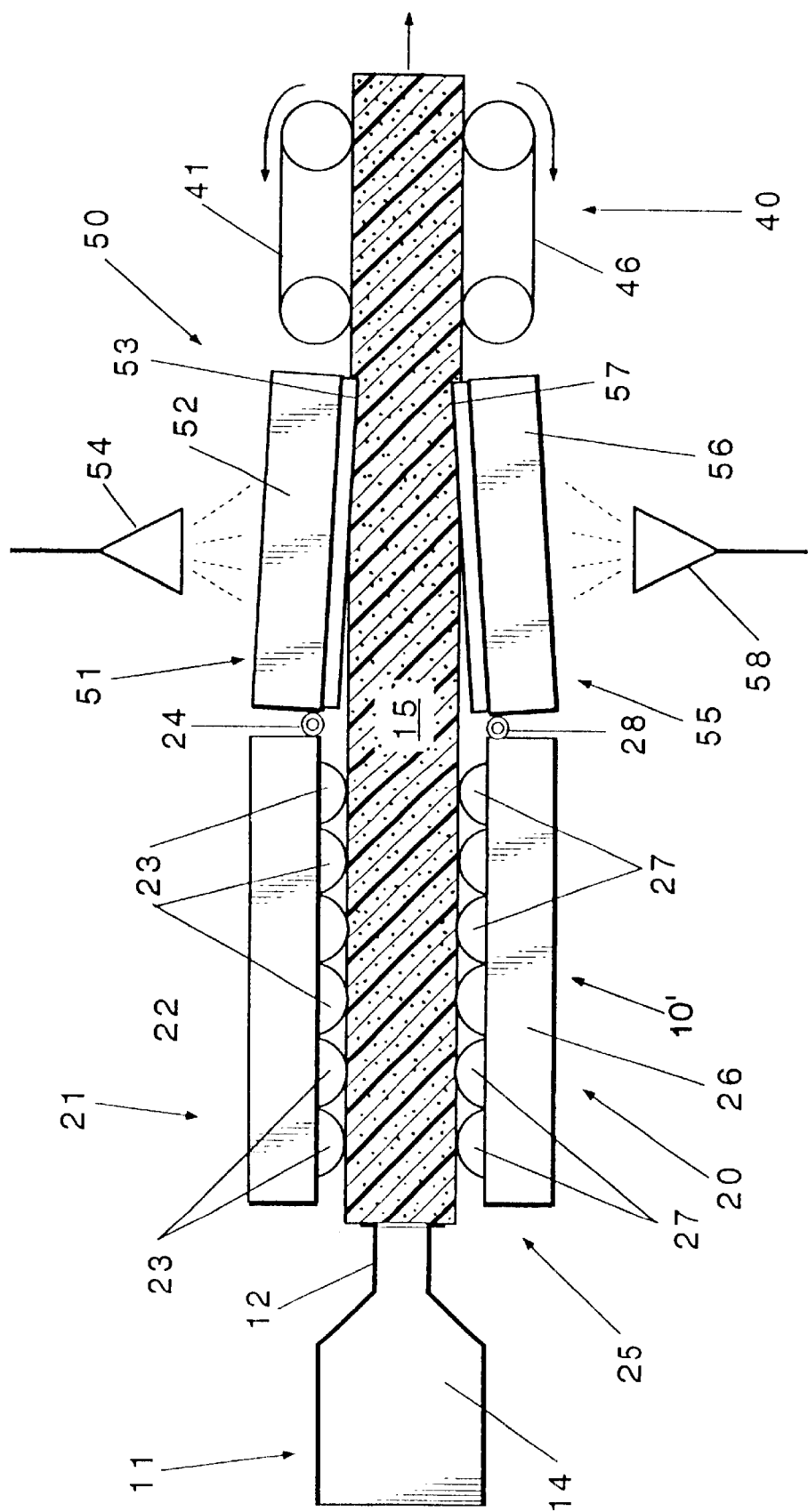
FIG. 2 is a schematic illustration of a foam-forming apparatus of an aspect related to the fifth aspect.

FIG. 2 schematically illustrates a foam-forming apparatus 10'. Apparatus 10' comprises a foam extrudate receiving assembly 20, a forming plate assembly 50, and a foam tensioning assembly 40.

The melt processing apparatus 11, the foam extrudate receiving assembly 20 and the foam tensioning assembly 40 shown in FIG. 2 are preferably the same as their counterparts shown in FIG. 1. Any differences in scale shown in the drawings is purely incidental.

Forming plate assembly 50 has an upper plate assembly 51 and a lower plate assembly 55 that is spaced apart from, but generally parallel to upper plate assembly 51. The upper plate assembly 51 comprises an upper base plate housing 52, a low friction foam contact plate 53 that is operatively connected to housing 52, and a lubricant applicator 54 that is operatively connected to housing 52 and in fluid communication with contact plate 53. Lubricant applicator 54 is, in turn, in fluid communication with a lubricant source (not shown). Lower plate assembly 55 comprises a lower base plate housing 56, a low friction foam contact plate 57 that is operatively connected to housing 56, and a lubricant applicator 58 that is operatively connected to housing 56 and in fluid communication with contact plate 57. Lubricant applicator 58 is, in turn, in fluid communication with a lubricant source (not shown).

The first roller frame 22 and the upper plate assembly 51 are operatively connected by way of at least one, preferably at least two, articulated linkages 24 (only one of which is shown). The second roller frame 26 and the lower plate assembly 55 are operatively connected by way of at least one, preferably at least two, articulated linkages (only one of which is shown).

In operation, a melt processing apparatus 11 preferably, operates in the same manner as described above for the same apparatus in FIG. 1.

A combination of pressure from apparatus 11 and action by rollers contained in the roller banks 21 and 25 moves foam body 15 from the first and second roller banks 21 and 25 to and through the forming plate assembly 50 and spaced apart upper plate assembly 51 and lower plate assembly 55. Foam body 15 exits forming plate assembly 50 and enters foam tensioning assembly 40 where it contacts first moving belt 41 and second moving belt 46. The moving belts 41 and 46 cooperate to draw the foam body away from the second roller assembly 30.

Once the foam tensioning assembly 40 begins to act upon and advance foam body 15 through the assembly, one may adjust spacing (and if necessary or desirable alignment) between the first and second roller banks 21 and 25 of assembly 20 and between the upper and lower plate assemblies 51 and 55 of assembly 50 to apply a greater or lesser amount of compressive force to the foam body as it advances through apparatus 10'.

Articulated linkages 24 and 28 operate in the same manner as their counter parts in FIG. 1 taking into account and differences between forming plate assembly 50 and second roller assembly 30.

The following examples illustrate, but do not in any way limit the scope of the present invention. Arabic numerals illustrate examples (Ex) of the invention and letters of the alphabet designate comparative examples (Comp Ex). All parts and percentages are by weight and all temperatures are in ° C. unless otherwise stated.

EX 1

Use a two inch (2") (50.8 mm) screw-type extruder that has two additional sequential zones for mixing and cooling after typical sequential zones for feeding, melting, and metering. Provide an opening for blowing agent injection between the metering and mixing zones. After the cooling zone, attach a strand die block having defined therein 132 circular apertures (arranged in an array of 6 rows with 22 apertures per row). Each aperture has a diameter of 0.8 mm. The apertures are spaced apart from one another in an equilateral triangular pattern with a distance between apertures of 3.6 mm. While this example uses circular apertures, skilled artisans understand that other aperture shapes may be used if desired.

Feed a granular PP homopolymer resin (PP-1, Moplen® D50G, 0.3 g/10 min MFR, Montell Polyolefins) into the extruder at a rate of 55 kg per hour (kg/h) together with 0.05 parts by weight, per hundred parts by weight of PP (pph) of antioxidant (AO-1, Irganox® 1010, Ciba-Geigy Corp.). Maintain the extruder at the following set point temperatures: feeding zone=160° C., melting zone=190° C., metering zone=200° C., and mixing zone=200° C. Inject isobutane into the mixing zone at a uniform rate of 17 pph.

Reduce the cooling zone temperature and die block temperature to 160° C. Adjust die gap within the die block to provide a stable coalesced foam strand structure free from prefoaming. The structure, while stable, retains a soft core.

Process the coalesced foam strand material through a foam-forming apparatus of the present invention, preferably that shown in FIG. 1 (fifth aspect), to yield samples for Test 1.1. The combination of roller assemblies and the foam tensioning assembly yields a smooth skinned coalesced foam strand material with a cross-sectional area more than 50% greater than that attainable without the combination.

Reduce the cooling zone temperature and die block temperature to 157° C. and achieve a stable coalesced foam strand structure. Take samples of the foam structure for Test 1.2.

A further reduction of cooling zone and die block temperatures to 155° C. yields a substantially closed-cell coalesced foam strand material.

Table 1 summarizes properties and parameters for Tests 1.1 and 1.2.

TABLE 1

| Test | Foam Temp (° C.) | Foam Size* T (mm) | Foam Size* W (mm) | Foam ρ (kg/m³) | Cell Size (mm) | Open-Cell Content (vol %) |
|---|---|---|---|---|---|---|
| 1.1 | 160 | 29 | 118 | 13.7 | 0.6 | 88 |
| 1.2 | 157 | 34 | 152 | 17.6 | 1.0 | 81 |

*T = thickness and W = width

The foam of Test 1.1 has a number of interior cells within strands that are broken or interconnected. The foam of Test 1.2 has a greater number of intact interior cells that that of Test 1.1. The open-cell content supports this observation. The foams of Tests 1.1 and 1.2 have respective thermal conductivities of 38.5 milliwatts per meter ° Kelvin (mW/M° K) and 42.2 mW/M° K.

EX 2

Duplicate Ex 1, Test 1.2 to provide Test 2.1 and modify test 2.1 by omitting use of the foam-forming apparatus to provide Test 2.2. Tables 2A and 2B summarize properties and parameters for Tests 2.1 and 2.2. Determine compressive strength in an extrusion direction (E) and vertical direction (V) at a 10% deflection per ASTM D 3575.

TABLE 2A

| Test No | Die Pressure (Mpa) | Foam Dimensions T (cm) | Foam Dimensions W (cm) | Foam Dimensions CS (cm²) | ρ (kg/m³) | Cell Size (mm) | Open Cell (vol %) |
|---|---|---|---|---|---|---|---|
| 2.1 | 5.6 | 3.5 | 15.9 | 55 | 17.6 | 1.04 | 81 |
| 2.2 | 5.3 | 2.9 | 11.7 | 34 | 15.6 | 0.96 | 75 |

TABLE 2B

| Test No | TC (Mw/M° K) | Compressive Stress (kPa) E | V | V/E |
|---|---|---|---|---|
| 2.1 | 42.2 | 38 | 13 | 0.34 |
| 2.2 | 41.5 | 50 | 15 | 0.30 |

The data in Tables 2A and 2B shows that use of the forming apparatus yields a foam (Test 2.1) with a cross-sectional area over 62% greater than that (Test 2.2) obtained for the same foam composition without the forming apparatus. In addition, use of the forming apparatus increases die pressure relative to processing the same foam composition without the forming apparatus. A high die pressure is believed to favor formation of low density polypropylene foam materials.

The data in Tables 2A and 2B also show that use of the forming apparatus (Test 2.1) leads to greater density, thermal conductivity and relative strength in the vertical direction (V/E) relative to absence of the forming apparatus (Test 2.2). While both foam materials are suitable for purposes of the present invention, that of Test 2.1 offers certain performance advantages relative to Test 2.2.

EX 3

Duplicate Ex 1, but reduce the feed rate to 50 kg/h, change the antioxidant to Irganox® XP 621 (Ceiba-Geigy Corp.) and modify the composition to add carbon black, a flame retardant and antimony trioxide ($Sb_2O_3$) at respective levels of 2.5 pph, 3 pph and 1 pph. The flame retardant is a bis(2,3-dibromopropyl) ether of tetrabromobisphenol-A (PE-68™, Great Lakes Chemical Corp.). Add the flame retardant as a 30 wt % concentrate in low density polyethylene (LDPE), the $Sb_2O_3$ as an 80 wt % concentrate in LDPE, and the carbon black (Aerosperse® 15, Engineered Carbons) as a 30 wt % concentrate in a polyolefin plastomer (POP). The LDPE has a melt index ($I_2$) of 20 grams/10 minutes (g/10 min) (ASTM D-1238, 190° C./2.16 kg). The POP has a density (ρ) of 0.9 g/cm3 and an $I_2$ of 1.0 (AFFINITY* PL 1880, The Dow Chemical Company). * A trademark of The Dow Chemical Company.

Use a temperature of 150° C. for the cooling zone and die block in order to produce a stable foam from which samples are taken for Test 3.1. This temperature leads to some plugging of orifices in the die block. Orifice plugging leads, in turn, to some open channels within the foam due to missing strands. The foam of Test 3.1 has a thickness of 22 mm and a width of 88 mm, a density of 19.2 kg/m3, a cell size of 0.4 mm and an open-cell content of 87 vol %. The foam also has a thermal conductivity (TC) of 34.0 mW/M° K.

EX 4

Replicate Ex 3, but eliminate carbon black, decrease flame retardant to 2.5 pph, increase $Sb_2O_3$ to 1.25 pph, and increase the cooling zone and die block temperature to 155° C. Provide the $Sb_2O_3$ as a concentrate in amorphous polypropylene (TMS grade (0.9–1.8 micrometer particle size) $Sb_2O_3$, Fyrebloc® 5AO-080Y8, Great Lakes Chemical Corporation). Tables 3A and 3B summarize properties and parameters for Tests 4.1 and 4.2. Test 4.2 uses the forming apparatus of Ex 1. Test 4.1 does not use the forming apparatus and is not an example of the present invention.

TABLE 3A

| Test No | Die Pressure (Mpa) | Foam Dimensions T (cm) | Foam Dimensions W (cm) | Foam Dimensions CS (cm²) | ρ (kg/m³) | Cell Size (mm) | Open Cell (vol %) |
|---|---|---|---|---|---|---|---|
| 4.1 | 4.1 | 2.5 | 9.8 | 25 | 17.7 | 0.25 | 43 |
| 4.2 | 5.0 | 3.2 | 13.4 | 43 | 15.3 | 0.25 | 30 |

TABLE 3B

| Test No | TC (Mw/ M° K) | Compressive Stress (kPa) | | |
|---|---|---|---|---|
| | | E | V | V/E |
| 4.1 | 35.1 | 77 | 23 | 0.30 |
| 4.2 | 38.7 | 40 | 30 | 0.75 |

As with Ex 2, the data in Tables 3A and 3B show that use of the forming apparatus of the invention yields desirable performance results. The thermal conductivity values show that the foam products may be used in thermal insulation applications (B2 rating per Deutsche Industrienorm (DIN) 4102).

EX 5

Replicate Ex 3, but substitute 2.5 pph of graphite (Grade PF-426, Graphite Sales Inc.) for the carbon black, reduce the level of flame retardant to 2.5 pph, reduce the feed rate to 45 kg/h, increase the level of antioxidant to 0.1 pph, and change the cooling zone and die block temperature to 156° C. (Test 5.1) or 154° C. (Test 5.2) to prepare foam materials. Tests 5.1 and 5.2 have an amount of 10% concentrate of glycerol monostearate (GMS, Atmer® 129, ICI Americas) in POP sufficient to provide a 0.5 pph level of GMS for Test 5.1 and a 1.5 pph level of GMS for Test 5.2. Test 5.2 uses the forming apparatus of Ex 1, but Test 5.1 does not. The foams of Tests 5.1 and 5.2 tend to be more closed-cell than those of Ex 1, but they have a thermal conductivity (see, Table 4) low enough to qualify for use as thermal insulating materials. Tables 4A and 4B summarize properties and parameters for Tests 5.1 and 5.2.

TABLE 4A

| Test No | Die Pressure (MPa) | Foam Dimensions | | | ρ (kg/m³) | Cell Size (mm) | Open Cell (vol %) |
|---|---|---|---|---|---|---|---|
| | | T (cm) | W (cm) | CS (cm²) | | | |
| 5.1* | 2.2 | 1.5 | 6.0 | 9 | 28.7 | 0.24 | 33 |
| 5.2 | 6.6 | 2.5 | 11.2 | 28 | 19.7 | 0.24 | 39 |

*not an example of the invention

TABLE 4B

| Test No | TC (Mw/M° K) | Compressive Stress (kPa) | | |
|---|---|---|---|---|
| | | E | V | V/E |
| 5.1* | 31.1 | 33 | 12 | 0.36 |
| 5.2 | 33.3 | 42 | 29 | 0.69 |

*not an example of the invention

The data in Tables 4A and 4B demonstrate the beneficial effects of using the forming apparatus described in Ex 1 as well as the suitability of such foam products for use in thermal insulation applications due to their relatively low thermal conductivity.

EX 6

With several modifications, duplicate Ex 1 to produce a sample for foam Test 6.1. Change the die to a 120 aperture die (8 rows of 15 apertures arranged in a triangular pattern as in Ex 1 with 0.9 mm apertures spaced 3.46 mm apart). Change the polymer to a blend of 90 wt % of a PP resin (PP-2, Pro-fax® 6823, 0.5 g/10 min MFR, Montell Polyolefins) and 10 wt % of the POP used in Ex 2. Increase the resin feed rate to 60 kg/h and decrease the isobutane to 16 pph. Produce the foam using a cooling zone and die block temperature of 160° C.

The foam of Test 6.1 is a coalesced foam strand product with a number of blown cells within each strand. The blown cells tend to leave a hollow channel within the foam strand. The foam of Test 6.1 has a thickness of 30 mm, a width of 68 mm, a density of 20.8 kg/m3, a cell size of 0.6 mm and an open-cell content of 87 vol %.

EX 7

With several modifications, replicate Ex 1 to produce foam materials for foam Tests 7.1, 7.2 and 7.3. Use a 6" (152.4 mm) extruder rather than the 2" (50.8 mm) of Ex 1 and a multi-aperture die with 1.02 mm diameter apertures arranged in a triangular pattern with an aperture to aperture spacing of 3.92 mm. Selectively open sufficient apertures to attain a desired foam cross-sectional size.

Use blends of three resins to prepare foam Tests 7.1, 7.2 and 7.3. The resins are the PP-2, PP-3 and the POP of Ex 3 in the following weight ratios: 68/20/12 for foam Tests 7.1 and 7.2 and 49/39/12 for foam Test 7.3. PP-3 is a high melt strength PP resin (Pro-fax® PF-814, 3 g/10 min MFR, Montell Polyolefins). Feed the blends to the extruder at a rate of 363 kg/h. Inject isobutane blowing agent at 14 pph for Tests 7.1 and 7.2 and 12 pph for Test 7.3.

Tests 7.1 and 7.2 use 0.1 pph each of AO-1 and AO-2. Test 7.3 uses 0.6 pph of AO-1 and 0.1 pph of AO-2. AO-2 is another antioxidant (Ultranox® 626, General Electric). As nucleators, Tests 7.1 and 7.2 use 0.2 pph calcium stearate and 0.4 pph talc and Test 7.3 uses 0.2 pph calcium stearate and 0.65 pph talc.

Use the following set point temperatures: feeding zone=170° C., melting zone=190° C., metering zone=210° C., and mixing zone=195° C. Inject isobutane at a predetermined rate as shown in Table 5. Cooling zone and die block temperatures of 167° C. yield a stable foam for foam Test 7.1. Reducing the temperature to 165° C. yields a substantially closed-cell foam for foam Test 7.2. A further temperature reduction to 160° C. yields a substantially closed-cell foam for foam Test 7.3.

Table 5 summarizes properties and parameters for Tests 7.1, 7.2 and 7.3.

TABLE 5

| Test | Foam Size | | Foam Density | Cell Size | Open-cell Content |
|---|---|---|---|---|---|
| | T (mm) | W (mm) | (kg/m³) | (mm) | (vol %) |
| 7.1 | 28 | 428 | 16.5 | 0.52 | 55 |
| 7.2* | 22 | 592 | 16.0 | 0.60 | 10 |
| 7.3* | 50 | 600 | 20.0 | 0.50 | 13 |

*Not an example of the Invention

The data in Table 5 demonstrate preparation of an open-cell coalesced foam strand plank product on a large scale apparatus by keeping the cooling zone temperature a few degrees hotter than the cooling zone temperature that yields a closed-cell foam.

EX 8

Replicate Ex 1, but increase the extruder feed rate to 60 kg/h, use 0.035 pph each of AO-1 and AO-2 and 0.05 pph talc, increase the isobutane feed rate to 21 pph, and reduce the foaming temperature to 158° C. to produce substantially closed-cell foams designated as Tests 8.1 and 8.2. Tables 6A and 6B summarize properties and parameters for Tests 8.1 and 8.2. Test 8.2 uses the foam forming apparatus of Ex 1. Test 8.1 does not and is not an example of the invention.

TABLE 6A

| Test No | Die Pressure (MPa) | Foam Dimensions T (cm) | W (cm) | CS (cm²) | ρ (kg/m³) | Cell Size (mm) | Open Cell (vol %) |
|---|---|---|---|---|---|---|---|
| 8.1 | 4.5 | 2.5 | 9.6 | 24 | 15.0 | 0.51 | 18 |
| 8.2 | 4.9 | 3.1 | 12.1 | 37 | 13.0 | 0.52 | 17 |

TABLE 6B

| Test No | TC (Mw/M° K) | Compressive Stress (kPa) E | V | V/E |
|---|---|---|---|---|
| 8.1 | 35.8 | 66 | 13 | 0.20 |
| 8.2 | 37.5 | 41 | 19 | 0.46 |

The data in Tables 6A and 6B show that use of the forming apparatus of Ex 1 (Test No 8.2) yields a very low density foam having a substantially closed-cell structure (<20 vol % open-cells) and that a large cross-sectional size can be prepared by forming.

EX 9

Subject the foams of Ex 1, 3, 6 and 7 to an airflow resistivity test (ISO 9053: 1991 (E) Method A). Weld sufficient samples of each Test material to build enough thickness to enable removal of cylindrical test specimens with a diameter of 65 mm and a thickness of 35 mm (foam strands aligned in the thickness direction). Fill the open channels in Test 3.1 with caulking compound prior to testing. Table 7 summarizes airflow resistivity and open-cell content for the indicated test foams.

TABLE 7

| Test | Airflow Resistivity (kPas/m²) | Open-cell Content (%) |
|---|---|---|
| 7.3* | 1093 | 13 |
| 7.2* | 74.5 | 10 |
| 7.1 | 21.3 | 55 |
| 1.2 | 19.9 | 81 |
| 1.1 | 7.1 | 88 |
| 3.1 | 5.7 | 87 |
| 6.1 | 4.3 | 87 |

*Not an example of the invention for purposes of sound insulation

Table 7 presents data in decreasing airflow resistivity order. Airflow resistivity generally relates inversely to open-cell content. The foams of Tests 7.2 and 7.3 are substantially closed-cell foams with a high airflow resistivity in the extrusion direction. A low airflow resistivity favors utility in sound insulation applications.

EX 10

Replicate Ex 3, but make a number of changes. Reduce the level of flame retardant to 2.5 pph and the level of carbon black to 2 pph. Increase the level of AO-1 to 0.1 pph, the isobutane to 19 pph and the foaming temperature to 151° C. Use the $Sb_2O_3$ concentrate of Ex 4 to provide an $Sb_2O_3$ of 1 pph and the GMS concentrate of Ex 5 to provide a GMS level of 0.4 pph. For Tests 10.2 through 10.4, inject 2 pph of a 75/25 by weight mixture of VORANOL* 9287 brand polyether polyol (The Dow Chemical Company) and ethanol into the mixing zone for cell size enlarging. *Trademark of The Dow Chemical Company. Tests 10.1 and 10.3 do not use the foam forming apparatus of Ex 1 and do not represent the present invention. Tests 10.2 and 10.4 do use that apparatus. Tables 8A and 8B summarize properties and parameters for Tests 10.1–10.4. The foams achieve the same DIN flammability rating of B2 as the foams of Ex 4.

TABLE 8A

| Test No | Die Pressure (MPa) | Foam Dimensions T (cm) | W (cm) | CS (cm²) | ρ (kg/m³) | Cell Size (mm) | Open Cell (vol %) |
|---|---|---|---|---|---|---|---|
| 10.1 | 2.6 | 2.1 | 8.4 | 17 | 18.0 | 0.33 | 32 |
| 10.2 | 3.2 | 2.4 | 9.9 | 24 | 15.9 | 0.39 | 19 |
| 10.3 | 2.6 | 2.0 | 8.4 | 17 | 18.2 | 0.33 | 22 |
| 10.4 | 3.2 | 2.4 | 10.5 | 26 | 14.8 | 0.38 | 21 |

TABLE 8B

| Test No | TC (Mw/M° K) | Compressive Stress (kPa) E | V | V/E |
|---|---|---|---|---|
| 10.1 | 35.8 | 70 | 12 | 0.17 |
| 10.2 | 35.7 | 47 | 15 | 0.32 |
| 10.3 | 33.7 | 56 | 10 | 0.18 |
| 10.4 | 34.7 | 31 | 19 | 0.61 |

The data in Tables 8A and 8B demonstrate the beneficial effects of forming on the die pressure, the foam cross-sectional size, the foam density and the cell size again is without increasing the open-cell content. In addition, the use of a VORANOL/ethanol mixture effectively decreases density of the formed foam.

EX 11

Subject samples from the foam Tests of Ex 1, 3, 6 and 7 to sound absorption testing using a Model 4206 acoustical impedance tube and Model 3555 signal analyzer both available from Brueel and Kjaer A/S, Naerum, Denmark. This measures a normal incidence sound absorption coefficient according to ASTM E-1050. Test both 29 mm and 100 mm diameter specimens.

The 29 mm specimens provide more accurate sound absorption data at high frequencies than the 100 mm specimens do. The reverse is true at low frequencies. A combination of the low frequency data from 100 mm specimens and high frequency data from 29 mm specimens provides a composite sound absorption curve.

Prepare test specimens having a length of 25 mm by welding together two or more foam pieces in a vertical direction to build up sample thickness. Bore test specimens from the welded pieces in the extrusion direction.

For vertical direction acoustic testing, weld two or more samples together such that the thickness of each sample is added to that of the other samples. One set of specimens is substantially free of perforation (V0h). A second set is perforated with a 2 mm needle to provide a perforation channel density of 1 hole/cm² (hole spacing of approximately 10 mm) (V1h). A third set is perforated with a 2 mm needle to provide a perforation channel density of 4 hole/cm² (hole spacing of approximately 5 mm) (V4h). Tables 9A–D present acoustic testing data. For all of Tables 9-D, E=extrusion direction, Max=maximum absorption coefficient determined at the first peak, if any, that occurs at the low frequency end of the composite sound absorption curve. $f_{max}$=the frequency where maximum absorption occurs.

TABLE 9A

| Freq | Foam Test 1.1 | | | | Foam Test 1.2 | | | |
| --- | --- | --- | --- | --- | --- | --- | --- | --- |
| (Hz) | E | V0h | V1h | V4h | E | V0h | V1h | V4h |
| 100 | 0.06 | 0.11 | −0.15 | −0.08 | 0.11 | −0.32 | 0.01 | 0.07 |
| 125 | 0.05 | 0.07 | −0.02 | −0.04 | 0.05 | 0.03 | 0.19 | 0.01 |
| 160 | 0.09 | 0.13 | 0.12 | 0.06 | 0.13 | 0.08 | 0.18 | 0.09 |
| 200 | 0.12 | 0.12 | 0.18 | 0.08 | 0.16 | 0.05 | 0.29 | 0.10 |
| 250 | 0.16 | 0.12 | 0.27 | 0.12 | 0.21 | 0.04 | 0.41 | 0.13 |
| 315 | 0.21 | 0.12 | 0.39 | 0.16 | 0.27 | 0.04 | 0.46 | 0.19 |
| 400 | 0.30 | 0.12 | 0.51 | 0.26 | 0.36 | 0.04 | 0.42 | 0.31 |
| 500 | 0.42 | 0.12 | 0.53 | 0.42 | 0.44 | 0.04 | 0.34 | 0.53 |
| 630 | 0.58 | 0.13 | 0.48 | 0.68 | 0.52 | 0.04 | 0.29 | 0.80 |
| 800 | 0.77 | 0.14 | 0.41 | 0.88 | 0.57 | 0.05 | 0.26 | 0.86 |
| 1000 | 0.91 | 0.15 | 0.37 | 0.81 | 0.59 | 0.07 | 0.25 | 0.68 |
| 1250 | 0.95 | 0.14 | 0.34 | 0.64 | 0.60 | 0.06 | 0.22 | 0.52 |
| 1600 | 0.89 | 0.15 | 0.32 | 0.52 | 0.62 | 0.06 | 0.20 | 0.46 |
| 2000 | 0.80 | 0.16 | 0.31 | 0.52 | 0.64 | 0.07 | 0.18 | 0.52 |
| 2500 | 0.75 | 0.17 | 0.35 | 0.58 | 0.67 | 0.09 | 0.18 | 0.74 |
| 3150 | 0.78 | 0.22 | 0.64 | 0.81 | 0.72 | 0.13 | 0.26 | 0.61 |
| 4000 | 0.87 | 0.42 | 0.67 | 0.73 | 0.76 | 0.36 | 0.62 | 0.40 |
| 5000 | 0.89 | 0.57 | 0.58 | 0.68 | 0.83 | 0.42 | 0.30 | 0.49 |
| 6300 | 0.85 | 0.36 | 0.49 | 0.66 | 0.82 | 0.27 | 0.26 | 0.44 |
| ASC | 0.57 | 0.14 | 0.37 | 0.47 | 0.47 | 0.05 | 0.29 | 0.47 |
| Max | 0.95 | 0.14 | 0.53 | 0.88 | 0.50 | 0.07 | 0.46 | 0.86 |
| $f_{max}$ | 1.25k | 800 | 500 | 800 | 1.25k | 1k | 315 | 800 |

TABLE 9B

| Freq | Foam Test 3.1 | | | | Foam Test 6.1 | | | |
| --- | --- | --- | --- | --- | --- | --- | --- | --- |
| (Hz) | E | V0h | V1h | V4h | E | V0h | V1h | V4h |
| 100 | 0.07 | 0.06 | 0.09 | 0.05 | 0.05 | 0.06 | 0.06 | −0.11 |
| 125 | 0.10 | 0.06 | 0.16 | 0.06 | 0.03 | 0.04 | 0.09 | 0.04 |
| 160 | 0.09 | 0.04 | 0.24 | 0.09 | 0.04 | 0.06 | 0.13 | 0.08 |
| 200 | 0.12 | 0.04 | 0.30 | 0.14 | 0.05 | 0.07 | 0.20 | 0.09 |
| 250 | 0.15 | 0.05 | 0.32 | 0.22 | 0.07 | 0.09 | 0.28 | 0.14 |
| 315 | 0.20 | 0.05 | 0.31 | 0.26 | 0.08 | 0.10 | 0.35 | 0.22 |
| 400 | 0.27 | 0.06 | 0.27 | 0.38 | 0.11 | 0.12 | 0.40 | 0.36 |
| 500 | 0.38 | 0.06 | 0.25 | 0.60 | 0.14 | 0.13 | 0.40 | 0.58 |
| 630 | 0.53 | 0.07 | 0.23 | 0.80 | 0.19 | 0.16 | 0.39 | 0.80 |
| 800 | 0.74 | 0.09 | 0.22 | 0.73 | 0.28 | 0.19 | 0.41 | 0.83 |
| 1000 | 0.93 | 0.08 | 0.20 | 0.58 | 0.39 | 0.24 | 0.43 | 0.71 |
| 1250 | 0.96 | 0.09 | 0.19 | 0.50 | 0.55 | 0.28 | 0.42 | 0.61 |
| 1600 | 0.85 | 0.08 | 0.18 | 0.53 | 0.70 | 0.34 | 0.40 | 0.60 |
| 2000 | 0.74 | 0.09 | 0.17 | 0.65 | 0.79 | 0.59 | 0.38 | 0.59 |
| 2500 | 0.69 | 0.11 | 0.18 | 0.81 | 0.76 | 0.85 | 0.43 | 0.79 |
| 3150 | 0.77 | 0.15 | 0.28 | 0.72 | 0.69 | 0.77 | 0.72 | 0.90 |
| 4000 | 0.91 | 0.37 | 0.47 | 0.59 | 0.69 | 0.69 | 0.68 | 0.80 |
| 5000 | 0.85 | 0.39 | 0.29 | 0.59 | 0.86 | 0.68 | 0.58 | 0.77 |
| 6300 | 0.81 | — | — | — | 0.98 | 0.68 | 0.55 | 0.79 |
| ASC | 0.55 | 0.07 | 0.23 | 0.51 | 0.35 | 0.26 | 0.37 | 0.51 |
| Max | 0.96 | 0.09 | 0.32 | 0.80 | 0.79 | 0.59 | 0.43 | 0.80 |
| $f_{max}$ | 1.25k | 800 | 250 | 630 | 2k | 2k | 1k | 630 |

TABLE 9C

| Freq | Foam Test 7.1 | | | | Foam Test 7.2* | | | |
| --- | --- | --- | --- | --- | --- | --- | --- | --- |
| (Hz) | E | V0h | V1h | V4h | E | V0h | V1h | V4h |
| 100 | −0.15 | 0.09 | 0.00 | 0.02 | 0.06 | 0.00 | −0.05 | 0.10 |
| 125 | 0.06 | −0.06 | −0.02 | 0.06 | 0.07 | 0.06 | −0.08 | 0.02 |
| 160 | 0.11 | 0.00 | 0.15 | 0.11 | 0.06 | 0.08 | 0.10 | 0.10 |
| 200 | 0.13 | 0.03 | 0.13 | 0.14 | 0.07 | 0.03 | 0.07 | 0.08 |
| 250 | 0.15 | 0.04 | 0.16 | 0.18 | 0.10 | 0.03 | 0.08 | 0.10 |
| 315 | 0.16 | 0.03 | 0.19 | 0.23 | 0.12 | 0.03 | 0.09 | 0.14 |
| 400 | 0.17 | 0.04 | 0.21 | 0.31 | 0.15 | 0.04 | 0.10 | 0.19 |
| 500 | 0.17 | 0.04 | 0.19 | 0.41 | 0.17 | 0.04 | 0.10 | 0.26 |
| 630 | 0.18 | 0.04 | 0.15 | 0.49 | 0.16 | 0.04 | 0.10 | 0.34 |
| 800 | 0.18 | 0.05 | 0.12 | 0.47 | 0.15 | 0.05 | 0.11 | 0.37 |
| 1000 | 0.19 | 0.06 | 0.12 | 0.39 | 0.16 | 0.07 | 0.13 | 0.34 |
| 1250 | 0.18 | 0.05 | 0.10 | 0.29 | 0.15 | 0.06 | 0.13 | 0.29 |
| 1600 | 0.19 | 0.06 | 0.12 | 0.25 | 0.15 | 0.06 | 0.13 | 0.25 |

TABLE 9C-continued

| Freq | Foam Test 7.1 | | | | Foam Test 7.2* | | | |
| --- | --- | --- | --- | --- | --- | --- | --- | --- |
| (Hz) | E | V0h | V1h | V4h | E | V0h | V1h | V4h |
| 2000 | 0.21 | 0.07 | 0.13 | 0.25 | 0.15 | 0.07 | 0.12 | 0.25 |
| 2500 | 0.24 | 0.08 | 0.15 | 0.30 | 0.16 | 0.08 | 0.13 | 0.30 |
| 3150 | 0.29 | 0.11 | 0.18 | 0.41 | 0.21 | 0.11 | 0.15 | 0.40 |
| 4000 | 0.33 | 0.16 | 0.25 | 0.58 | 0.26 | 0.14 | 0.20 | 0.51 |
| 5000 | 0.38 | 0.24 | 0.46 | 0.67 | 0.32 | 0.22 | 0.35 | 0.67 |
| 6300 | 0.49 | 0.52 | 0.53 | 0.55 | 0.47 | 0.52 | 0.80 | 0.51 |
| ASC | 0.18 | 0.05 | 0.15 | 0.31 | 0.14 | 0.05 | 0.11 | 0.24 |
| Max | 0.19 | 0.06 | 0.21 | 0.49 | 0.17 | 0.07 | 0.13 | 0.37 |
| $f_{max}$ | 1k | 1k | 400 | 630 | 500 | 1k | 1k | 800 |

*means not an example of the invention

TABLE 9D

| Freq | Foam Test 7.3* | | | |
| --- | --- | --- | --- | --- |
| (Hz) | E | V0h | V1h | V4h |
| 100 | −0.10 | 0.02 | 0.03 | 0.04 |
| 125 | 0.01 | 0.02 | 0.04 | 0.03 |
| 160 | 0.02 | 0.02 | 0.05 | 0.03 |
| 200 | 0.04 | 0.03 | 0.05 | 0.04 |
| 250 | 0.03 | 0.02 | 0.06 | 0.06 |
| 315 | 0.04 | 0.02 | 0.08 | 0.08 |
| 400 | 0.04 | 0.02 | 0.08 | 0.12 |
| 500 | 0.05 | 0.03 | 0.07 | 0.18 |
| 630 | 0.06 | 0.03 | 0.06 | 0.24 |
| 800 | 0.08 | 0.04 | 0.06 | 0.24 |
| 1000 | 0.13 | 0.03 | 0.05 | 0.17 |
| 1250 | 0.13 | 0.04 | 0.06 | 0.14 |
| 1600 | 0.18 | 0.04 | 0.06 | 0.12 |
| 2000 | 0.22 | 0.05 | 0.07 | 0.14 |
| 2500 | 0.23 | 0.07 | 0.12 | 0.20 |
| 3150 | 0.21 | 0.09 | 0.15 | 0.29 |
| 4000 | 0.21 | 0.15 | 0.21 | 0.39 |
| 5000 | 0.27 | 0.41 | 0.52 | 0.52 |
| 6300 | 0.31 | — | — | — |
| ASC | 0.11 | 0.03 | 0.06 | 0.14 |
| Max | 0.31 | 0.04 | 0.08 | 0.24 |
| $f_{max}$ | 6.3k | 800 | 315 | 630 |

*means not an example of the invention

The porous open-cell foams prepared in Ex 1, 3 and 6 absorb sound well in the extrusion direction as anticipated from their low air flow resistance. The partial open-cell foam of Test 7.1 shows marginally useful sound absorption characteristics in the extrusion direction. The substantially closed-cell foams prepared in Test Nos. 7.2 and 7.3 are unsatisfactory in sound absorption in the extrusion direction. Perforation enhances sound absorption in the vertical direction, even for the foam of Test No. 6.1 (hollow foam) which is suitable for use in some applications without perforation. Without perforation, all foams with a possible exception of the hollow coalesced foam strand material (Test No. 6.1) are not satisfactory in sound absorption in the vertical direction, the direction to which the foams are often utilized. Some foam materials require greater perforation than others do in order to reach an ASC of 0.3 or greater. Still other foam materials require no perforation at all to reach an ASC of 0.3 or more.

EX 12

Subject foams from Tests 1.1, 7.1 and 7.2 to dynamic stiffness testing. Cut two sets of 10 cm×10 cm specimens from the foams. One set, designed to be tested in an uncompressed state, has the thicknesses shown in Table 11. The other set is first compressed, allowed to recover and then cut into the thicknesses shown in Table 11. Compression or elastification occurs by applying sufficient pressure to compress the specimens to 95% of their original thickness and then releasing the applied pressure and allowing the foam to recover. Place a 10 cm by 10 cm, 2 kg weight on the foam specimens to provide a surface weight of 200 kilograms per square meter ($kg/m^2$) and determine dynamic stiffness according to ISO 9052-1. Multiply dynamic stiffness measurements by specimen thickness to calculate dynamic modulus. Table 11 identifies foam Test number, specimen thickness (T) in mm, whether the sample is elastified (compressed), dynamic stiffness (DS) in mega-Newtons per cubic meter ($MN/m^3$) and dynamic modulus (DM) in Newtons per square millimeter ($N/mm^2$).

TABLE 11

| Foam Test No. | T (mm) | Compressed (Y/N) | DS ($MN/m^3$) | DM ($N/mm^2$) |
|---|---|---|---|---|
| 1.1 | 25 | N | 27 | 0.7 |
| 1.1 | 17.5 | Y | 4 | 0.1 |
| 7.1 | 25 | N | 43 | 1.1 |
| 7.1 | 25 | Y | 28 | 0.7 |
| *7.2 | 10 | N | 79 | 0.8 |
| *7.2 | 10 | Y | 62 | 0.6 |

*means not an example of the invention

The data in Table 11 demonstrate that open-cell foams of the present invention (Tests 1.1 and 7.1) have a low dynamic stiffness and dynamic modulus (particularly after compression/elasticization) relative to the closed cell foam of Test *7.2. Foam Test 1.1 readily elastifies as shown by the nearly seven-fold improvement in both dynamic stiffness and dynamic modulus. Such a foam has utility as an insertion material for a sandwich panel or a plaster board laminate (PBL) as well as for impact sound insulation applications. The resulting laminate has utility in both thermal and acoustical insulation of a wall structure.

EX 13

Replicate Ex 1, but use a 3½ inch (89 mm) extruder equipped with the die of Ex 7 to convert a 70/30 weight ratio polypropylene/ethylene-octene-1 (PP/EO) polymer blend into foam Test 11.1. Maintain the extruder at the following set point temperatures: feeding zone=170° C.; melting zone=205° C.; metering zone=220° C.; mixing zone=190° C.; and cooling zone and extruder die=153° C. Feed AO-1 and AO-2, each at a rate of 0.13 pph, talc at a rate of 0.15 pph and HCFC-142b at a rate of 12 pph.

The PP is a developmental high melt strength resin composite that has a melt flow rate (MFR) of 0.6 grams/10 minutes (g/10 min) (ASTM D-1238, 230° C./2.16 kg) (Himont Incorporated). The composite is a 50/50 weight ratio blend of a branched PP copolymer resin (MFR of 2 g/10 min) and a conventional PP homopolymer (MFR of 0.3 g/10 min). The EO is an ethylene/octene-1 copolymer (AFFINITY* FW 1650. 0.902 $g/cm^3$ density, 3.0 g/10 min melt index (12) (ASTM D-1238, 190° C./2.16 kg), The Dow Chemical Company).

The resulting foam has a substantially open-cell structure (85% open cell per ASTM D 2856, Procedure A) and a cell size of 0.94 mm. The foam has a density of 40.4 $kg/m^3$ and a cross-sectional area of 45 mm by 505 mm.

Subject the foam to sound absorption testing as in Ex 11 (with fewer frequencies as shown in Table 12) and display the results in Table 12.

TABLE 12

| Freq | Foam Test 11.1 | | | |
|---|---|---|---|---|
| (Hz) | E | V0h | V1h | V4h |
| 250 | 0.15 | 0.05 | 0.18 | 0.16 |
| 500 | 0.22 | 0.09 | 0.25 | 0.43 |
| 1000 | 0.24 | 0.13 | 0.21 | 0.45 |
| 2000 | 0.34 | 0.23 | 0.31 | 0.46 |
| 5000 | 0.54 | 0.68 | 0.58 | 0.74 |
| ASC | 0.24 | 0.12 | 0.24 | 0.37 |
| Max | 0.56 | 0.68 | 0.80 | 0.50 |
| $f_{max}$ | 4000 | 5000 | 4000 | 630 |

Use a 105 cm×205 cm panel to determine sound reduction index ($R'_w$) data per ISO 717/1-1982. Use one of two configurations for test data and either nascent (Oust formed and with no perforation) foam or foam perforated as for V1h). One configuration (nominally "I") is a straight foam slab with a thickness of 50 mm). The other configuration (nominally "W") is a 40 mm thick foam slab supported by foam strips spaced 205 mm apart on alternating sides of the slab. The strips have a width of 40 mm and a thickness of 5 mm. Testing institutions such as Centre Experimental de Recherche et d'Etudes du Batiment et des Travaux Publics (CEBTP) readily perform such testing.

The $R'_w$ for nascent foam is 31 dB in the I configuration and 33 dB in the W configuration. The $R'_w$ for perforated foam is 39 dB. This data shows the benefit of perforation.

EX 14

With several modifications, replicate Ex 1 to produce foam materials for foam Test 14.1. Change the extruder to a 6" (152.4 mm) extruder and the die to a 1950 aperture die (13 rows of 150 apertures arranged in a triangular pattern as in Ex 1 with 0.84 mm apertures spaced 3.53 mm apart). Feed PP-2 resin into the extruder at a rate of 544 kg/h together with 0.2 pph of a powdery antioxidant (Ultranox® 815P, General Electric (AO-3)) and 0.8 pph of a concentrate of AO-1 (15 wt %, based on concentrate weight, of AO-1 in a low density polyethylene resin having a melt index (12) of 1.8grams/10 minutes (g/10 min) (ASTM D-1238, 190° C./2.16 kg) and density of 0.923 $g/cm^3$). Change the set point temperatures as follows: feeding zone=170° C., melting zone=190° C., metering zone=210° C., and mixing zone=195° C. Reduce the isobutane feed rate to 16.5 pph. Use a cooling zone and die block temperature of 158° C. to produce a stable foam.

Table 13 summarizes properties and parameters for Test 14.1.

TABLE 13

| Test | Foam Size T (mm) | Foam Size W (mm) | Foam Density (kg/m³) | Cell Size (mm) | Open-cell Content (vol %) |
|---|---|---|---|---|---|
| 14.1 | 57 | 685 | 14.7 | 1.43 | 69 |

The data in Table 13 demonstrate preparation of an open-cell coalesced foam strand plank product representing the present invention on a larger scale apparatus.

EX 15

Subject the foam from Test 14.1 to dynamic modulus and dynamic stiffness testing as in Ex 12, and sound absorption coefficient testing as in Ex 10. Test the foam both as extruded and after perforation (V4h as in Ex 10) and compression treatment (as in Ex 12). Tables 14A and 14B summarize test data.

Table 14A summarizes dynamic modulus and airflow resistivity for Test 15.

TABLE 14A

| Foam Treatment | T (mm) | DS (MN/m³) | DM (N/mm²) |
|---|---|---|---|
| As extruded | 45 | 47 | 0.51 |
| Perforated and Compressed | 45 | 15 | 0.16 |

Table 14B summarizes sound absorption coefficient of Test 15.

TABLE 14B

| Frequency | As Extruded | Perforated & Compressed |
|---|---|---|
| 100 | 0.06 | 0.09 |
| 125 | 0.08 | 0.13 |
| 160 | 0.09 | 0.20 |
| 200 | 0.10 | 0.33 |
| 250 | 0.11 | 0.47 |
| 315 | 0.12 | 0.60 |
| 400 | 0.12 | 0.83 |
| 500 | 0.12 | 0.83 |
| 630 | 0.13 | 0.64 |
| 800 | 0.14 | 0.48 |
| 1000 | 0.13 | 0.40 |
| 1250 | 0.15 | 0.41 |
| 1600 | 0.17 | 0.39 |
| 2000 | 0.18 | 0.52 |
| 2500 | 0.20 | 0.76 |
| 3150 | 0.25 | 0.74 |
| 4000 | 0.53 | 0.62 |
| 5000 | 0.53 | 0.56 |
| ASC | 0.14 | 0.55 |

The data in Tables 14A and 14B indicate that the foam material made in Test 14, when perforated and compressed, becomes an excellent acoustical material with a low dynamic stiffness, and good sound absorption coefficients.

EX 16

Prepare plaster board laminates (PBL) from as extruded foam (Ex 14) and foam that is perforated and compressed (Ex 15). In preparing the PBLs, first laminate foam planks to build a foam laminate with a thickness of 77 mm, then laminate the foam laminate to 13 mm thick plaster board. Adhere each PBL to a 160 mm thick concrete wall to cover the entire 2.5 m×4 m wall surface using mortar dabs and subject the resulting structures to sound transmission loss measurements (in decibels (dB)) at frequencies shown in Table 15 and calculate a sound reduction index ($R'_w$) for each structure in accordance with International Standards Organization (ISO) test 717-1. Testing institutions such as CEBTP perform such testing.

TABLE 15

Sound Transmission Loss Data for Test 16

| Freq. (Hz) | 160 mm Concrete (dB) | with PBL made of as extruded foam (dB) | with PBL made of perforated and compressed foam (dB) |
|---|---|---|---|
| 100 | 47.0 | 42.7 | 42.1 |
| 125 | 37.7 | 35.9 | 40.7 |
| 160 | 42.5 | 39.7 | 47.0 |
| 200 | 43.0 | 46.2 | 53.1 |
| 250 | 47.1 | 53.3 | 59.4 |
| 315 | 49.0 | 60.1 | 64.3 |
| 400 | 52.0 | 65.7 | 68.8 |
| 500 | 57.9 | 73.8 | 75.2 |
| 630 | 62.1 | 79.2 | 78.4 |
| 800 | 64.9 | 82.6 | 84.5 |
| 1000 | 66.0 | 82.0 | 90.2 |
| 1250 | 68.8 | 89.2 | 93.3 |
| 1600 | 70.9 | 96.0 | 96.7 |
| 2000 | 72.6 | 93.8 | 95.0 |
| 2500 | 73.7 | 89.2 | 90.0 |
| 3150 | 76.5 | 96.5 | 96.4 |
| 4000 | 79.0 | 100.8 | 99.2 |
| 5000 | 80.3 | 99.6 | 98.2 |
| $R'_w$ | 58 | 62 | 67 |

The data in Table 15 indicate that the open-cell foam prepared in Test 14 performs well as sound insulation layer, especially when perforated and compressed. In a PBL structure, the perforated and compressed foam provides as much as 9 dB improvement in $R'_w$ over a bare concrete wall.

Similar results are expected with other foam materials prepared in accordance with the present invention, especially those prepared using the foam-forming apparatus of the present invention.

What is claimed is:

1. An extruded, open-cell, coalesced foam strand material that comprises a propylene polymer material and has a density of 20 kilograms per cubic meter or less, an open-cell content of at least 20 percent and a cell size of two millimeters or less.

2. An extruded, open-cell, acoustically active, coalesced foam strand material that comprises a propylene polymer material and has a density of 100 kilograms per cubic meter or less, an open-cell content of at least 50 percent, a cell size of two millimeters or less and, in its extrusion direction, a noise reduction coefficient of at least 0.3, the foam having defined therein a plurality of perforation channels, the channels being oriented in a direction generally perpendicular to the extrusion direction.

3. An extruded, open-cell, coalesced foam strand material that comprises a propylene polymer material and has a density $\leq 22$ kg/m³ and an open-cell content $\geq 80$ percent.

4. The material of claim 1 having an open-cell content of at least 50 percent.

5. The material of claim 1 having an airflow resistivity less than 25 kilopascal seconds per square meter.

6. The material of claim 2 having an airflow resistivity less than 25 kilopascal seconds per square meter.

7. The material of claim 1 having an open-cell content of at least 80 percent.

8. The material of claim 2 having an open-cell content of at least 80 percent.

9. The material of claim 2, wherein the perforation channels occur at a frequency of at least one bole per square centimeter with a spacing between holes of about 10 millimeters.

10. The material of claim 2, wherein the perforation channels occur at a frequency of at least four holes per square centimeter with a spacing between holes of about 5 millimeters.

11. The material of claim 2, wherein the perforation channels are mechanically induced.

12. The material of claim 2, wherein the material, following elastification, has a dynamic modulus of less than 1 Newton per square millimeter.

13. The material of claim 12, wherein the dynamic modulus is less than 0.6 Newton per square millimeter.

14. The material of claim 4, wherein the dynamic modulus is less than 1 Newton per square millimeter.

15. The material of claim 4, wherein the dynamic modulus is less than 0.6 Newton per square millimeter.

16. A sound insulation structure comprising at least one layer of the material of claim 12.

17. A sound insulation structure comprising at least one layer of the material of claim 14.

18. The material of claim 1, wherein the material has an open cell content less than 80 percent and a thermal conductivity of no more than 45 milliwatts per meter ° Kelvin.

19. The material of claim 18 wherein the material has an open cell content less than 70 percent and a thermal conductivity of no more than 40 milliwatts per meter ° Kelvin.

20. The material of claim 18 wherein the material has an open cell content less than 60 percent and a thermal conductivity is no more than 35 milliwatts per meter ° Kelvin.

* * * * *